United States Patent
Keithly et al.

(10) Patent No.: US 6,860,232 B2
(45) Date of Patent: *Mar. 1, 2005

(54) COMMERCIAL POULTRY LITTER ENHANCEMENT WITH CITRUS SOURCES

(76) Inventors: James H. Keithly, 1108 De Narvaez Ave., Bradenton, FL (US) 34209; Thomas Taggart, 5202 34th Ave. W., Bradenton, FL (US) 34209; David L. Wilson, 48 Lyle Field Rd., Jefferson, GA (US) 30549

( * ) Notice: Subject to any disclaimer, the term of this patent is extended or adjusted under 35 U.S.C. 154(b) by 0 days.

This patent is subject to a terminal disclaimer.

(21) Appl. No.: 10/342,481

(22) Filed: Jan. 15, 2003

(65) Prior Publication Data

US 2003/0164144 A1 Sep. 4, 2003

Related U.S. Application Data

(63) Continuation of application No. 10/341,729, filed on Jan. 14, 2003, now Pat. No. 6,708,647, which is a division of application No. 09/898,997, filed on Jul. 3, 2001, and application No. 10/342,481, which is a continuation of application No. 10/046,473, filed on Jan. 14, 2002, now abandoned, which is a continuation-in-part of application No. 09/898,997, filed on Jul. 3, 2001, now Pat. No. 6,523,496.

(51) Int. Cl.⁷ .............................................. A01K 29/00
(52) U.S. Cl. ...................................................... 119/171
(58) Field of Search .............................. 119/171, 172, 119/173, 174, 347, 417, 416

(56) References Cited

U.S. PATENT DOCUMENTS

| | | |
|---|---|---|
| 4,424,763 A | 1/1984 | Johnson |
| 4,676,196 A | 6/1987 | Lojek et al. |
| 4,737,582 A | 4/1988 | Goldman et al. |
| 5,526,771 A | 6/1996 | Ito |
| 5,542,374 A | 8/1996 | Palmer, Jr. |
| 5,605,114 A | 2/1997 | Peltenburg et al. |
| 5,970,916 A | 10/1999 | Yoder et al. |
| 6,017,525 A | 1/2000 | Logan et al. |
| 6,287,550 B1 | 9/2001 | Trinh et al. |
| 6,523,496 B1 * | 2/2003 | Keithly et al. ............... 119/171 |
| 2003/0131799 A1 | 7/2003 | Wong et al. |
| 2003/0205204 A1 | 11/2003 | Wang et al. |

OTHER PUBLICATIONS

R.H. Harm, et al, "Citrus Pulp for Poultry Litter and Its Subsequent Feeding Value For Ruminants", Bulletin 724 (Technical), Apr. 1968.*

Robert J. Braddock, Handbook of Citrus By–Products and Processing Technology, University of Florida, 1999 by John Wiley & Sons, Inc.*

Sorbara, J.O.B., et al, "Evaluation of Citrus Pulp Pellets as Broiler Litter", Department of Animal Husbandry, Paulista Sate University, School of Agrarian and Veterinary Sciences (circa 1999).*

(List continued on next page.)

Primary Examiner—Charles T. Jordan
Assistant Examiner—Judith A. Nelson
(74) Attorney, Agent, or Firm—Cook, Alex, McFarron, Manzo, Cummings & Mehler, Ltd.

(57) ABSTRACT

An improved poultry bedding litter composition includes byproduct or waste material from citrus juice extraction. The citrus peel byproduct or waste litter containing compositions improve poultry characteristics and enhance feed conversion when compared with traditional poultry bedding litters. They also reduce ammonia formation and are very beneficial in addressing litter beetle problems.

41 Claims, 6 Drawing Sheets

OTHER PUBLICATIONS

Michael P. Lacy, "Litter Quality and Broiler Performance", The University of Georgia Cooperative Extension Service.*

Madrid, et al., In Vitro Determination of Ruminal Dry Matter and Cell Wall Degradation, and Production of Fermeniation End–Products of Various By–Products, Anim. Res. 51 (2002) 189–199.

Bagnall, et al., "Hydrilla Silage Production, Composition And Acceptability", J. Aquat. Plant Manage. 16:1978, pp. 27–31.

N. Rimani, et al., Influence of Level of Urea and Method of Supplementation on Characteristics of Digestion of High–Fiber Diets By Sheep. J. Amin. Sci. 1993. 71:1657–1665.

A. A. Taiwo, et al., et al., "Techniques for Trapping Ammonia Generated From Urea Treatment of Barley Straw", Animal Feed Science Technology 56 (1995) 133–141.

M. Kreuzer, et al., "Reduction of Gaseous Nitrogen Loss From Pig Manure Using Feeds Rich in Easily–Fermentable Non–Startch Polysaccharides", Animal Feed Science and Technology 73 (1998) 1–19.

P. Ariza, et al., "Effects of Carbohydrates From Citrus Pulp and Hominy Feed on Micriobial Fermentation in Continuous Culture", J. Amin. Sci. 2001. 79:2713–2718.

Santos, et al., "Processamento do grao de milho e sua substitulcao parcial por polpa de citros pelefixada sobre o desempenho, digestibilidede de nutrientes e paramentros sanguineos em vacas leiteiras", Maringa, v. 23, n. 4, p. 923–931, 2001.

Broderick, et al., "Efficacy of Carbohydrate Sources for Milk Production by Cows Fed Diets Based on Alfalfa Silage", J. Dairy Sci. 85:1767–1776.

* cited by examiner

COMMERCIAL POULTRY LITTER ENHANCEMENT WITH CITRUS SOURCES

CROSS REFERENCE TO RELATED APPLICATION

This is a continuation of application Ser. No. 10/341,729, filed Jan. 14, 2003, now U.S. Pat. No. 6,708,647, which is a division of application Ser. No. 09/898,997, filed Jul. 3, 2001 now U.S. Pat. No. 6,523,496; and this is a continuation of application Ser. No. 10/046,473, filed Jan. 14, 2002, now abandoned, which is a continuation-in-part of application Ser. No. 09/898,997, filed Jul. 3, 2001, now U.S. Pat. No. 6,523,496.

BACKGROUND OF THE INVENTION

1. Field of the Invention

The present invention relates to litter or bedding for commercial poultry raising facilities, along with a process for improving and enhancing the commercial viability of these types of facilities. The invention also provides a valuable and economically attractive use of citrus byproduct or waste, including components thereof, for use as the litter or bedding in commercial poultry raising operations. Citrus byproduct can be used alone or in combination with traditional bedding components.

The citrus byproduct invention improves the performance of the litter or bedding, including reducing ammonia levels and litter moisture. The invention also improves the birds raised, such as by significantly reducing the occurrence of poultry imperfections, enhancing bird health and feed efficiency and reducing bird mortality. Implementation of the invention successfully addresses a vexing problem of beetle infestation in commercial poultry raising.

2. Description of Related Art

Current commercial-scale poultry raising operations house the poultry in confined spaces. Floors of those spaces traditionally are covered with bedding litter material. Feed and water is made available to the chicks so they can mature into adult birds which typically are intended as a food source. Generally, these are high volume facilities, and efficiency and cost control are extremely important. While the majority of these operations are for chicken production, other poultry can be included, such as turkey, ducks, geese and less common poultry as well.

In a typical commercial operation of this type, the poultry remains on the litter or bedding for the duration of its stay within the confined location. Under these circumstances, excretion and feces from the birds collect on the litter bed throughout the birds' stay within the confined space. While the birds remain under these conditions, the volume of bird droppings increases throughout this confinement period. Under these conditions, conventional bedding litter materials tend to deteriorate, and their effectiveness in functioning to reduce contact between the birds and their droppings is severely tested. Many litter materials fail in their intended function, especially as the time during which the birds live on the litter increases. Furthermore, most litter materials do not provide any substantial active components to counteract the negative effects of the bird excrement.

Poor litter performance is undesirable. It can allow for contact between the birds and deleterious droppings components and/or resultant products such as ammonia. Used litter also becomes seeded with pathogens and fungi. Parasites, for example, can be found in poultry pen litter. Litter beetles can flourish and are highly destructive. Moist conditions typically contribute significantly to forming or providing a breeding ground for certain negative litter quality factors, as noted in Lacy, "*Litter Quality and Broiler Performance,*" *The University of Georgia Cooperative Extension Service*, Athens, Ga., 1991, incorporated by reference hereinto. In some commercial poultry operations, litter is reused for multiple growing cycles, creating even greater challenges for the bedding litter.

Rehberger U.S. Pat. No. 5,945,333, incorporated by reference hereinto, recognizes these types of problems and their manifestation as foot pad lesions, breast blisters, and air sac infections, for example. This prior art patent proposes a biological solution to these litter problems by treating poultry litter with a composition for producing a certain blend of bacteria. This proposed type of treatment adds cost, can be perceived as a non-organic approach, and does not address the inherent deficiencies of conventional litter material itself.

Typically preferred litter material for poultry houses is a cellulosic litter from woody sources such as pine wood shavings and saw dust. As noted in the Lacy article, other proposed litter materials include various other cellulosic and woody materials, each having disadvantages as noted in that article. Included in this suggested litter material are hardwood shavings and sawdust, pine or hardwood chips, processed paper, rice hulls, peanut hulls, sugarcane pomace (bagasse), crushed corn cobs, and chopped straw, hay or corn stover.

Prior art proposal have included citrus-originating materials for use in poultry litter. In Harms et al., "*Citrus Pulp for Poultry Litter and its Subsequent Feeding Value for Ruminants,*" *Agricultural Experiment Stations Institute of Food and Agricultural Sciences University of Florida*, Gainsville, Fla., Technical Bulletin 724, April, 1968, incorporated by reference hereinto, the authors report on testing which they state indicates that citrus pulp could be used as a litter for broils chicks without adversely affecting their performance and that citrus pulp was a satisfactory material for absorbing moisture from the droppings. Sabara et al., "*Evaluation of Citrus Pulp Pellets as Broiler Litter*", *Brazilian Journal of Poultry Science*, Sao Paulo, Brazil, Volume 2, Number 3, Pages 273–280, 2000, incorporated by reference hereinto, mentions the use of citrus pulp pellets in litter beds for chickens. Lower pH values and elevated temperatures were reported for the citrus pulp pellet litter beds.

While poultry house litter or bedding has long been recognized as falling far short of solving many problems associated with raising poultry under economically efficient but confining conditions which are typically characteristic of commercial poultry raising operations, proposals heretofore have fallen short of successfully addressing a multitude of concerns within the poultry industry.

Previously proposed approaches include adding expensive active agents to conventional bedding materials. While these may be useful in treating particular problems such as pathogens, they do so with added cost and require added worker time and/or they often do not address other, larger overall issue such as bed deterioration, ammonia, moisture, bird quality and mortality, beetle infestation, and feed efficiency. Active agent addition typically is required when the same litter material is used for multiple growing cycles, usually being incorporated during turning or fluffing of the previously used litter right in the pen. At times, non-organic agents are proposed for these purposes and for either fresh or recycled litter.

A particularly desirable solution would be to be able to use an inexpensive natural source for a litter or bedding component or as a litter material itself in order to address these types of long-standing problems. Effective materials which do not require processing to be suitable for use in fresh or recycled bedding litter are recognized herein as being of value in this regard.

The present invention addresses these problems and objectives by providing litter or litter components which are inexpensive, widely available and advantageous as litter material. The invention provides a bedding litter for poultry raising houses which has as the litter material itself, either alone or combined with other litter materials, citrus byproduct which is citrus peel from citrus operations or components from citrus peel or pulp byproduct or waste from citrus juice extraction. The invention also entails a process for enhancing commercial poultry raising operations, which includes adding citrus byproduct material to the floor area of a space within which poultry chicks are raised until they achieve a size suitable for commercial meat supplies, while reducing poultry imperfections, adjusted feed conversion and beetle infestation and while improving the value of the poultry meat.

An object of the present invention is to provide an improved bedding litter for commercial poultry operations.

An object of the present invention is to provide an improved bedding litter for commercial poultry operations or to improve existing bedding litter for these types of uses.

Another object of the present invention is to provide an improved poultry litter using a natural organic source of bedding litter and an improved poultry raising process which reduces imperfections in poultry during the course of poultry contact with the litter and which results in improvements in poultry raising economics.

Another object of this invention is to provide an improved poultry litter composition and poultry raising enhancement process by which a change in the composition of the poultry litter itself addresses substantial problems in poultry raising.

Another object of the present invention is to provide an economically beneficial and productive outlet for large quantities of solid byproduct from commercial citrus juice expressing operations which otherwise would be of low economic value.

A further object of this invention is to provide a product and process which enhances the effectiveness of poultry feed in translating into bird weight.

Another object of this invention is to provide an improved poultry litter and process for reducing moisture and ammonia build up during the growing cycle of the birds.

Another object of this invention is to provide an improved poultry litter and process by which beetles such as darkling beetles and their larva are controlled.

Another object of embodiments of the present invention is to provide a product and process in the poultry litter business where litter components remain as intact particles that are not substantially degraded, do not turn to compost, and do not cake together in the manner experienced by conventionally used current bedding litters.

Another object of embodiments of this invention is to provide improved product and process advances which use effective and inexpensive litter material in its "native" state without requiring extraction, isolation, purification, and/or physical modification.

A further object of the present invention is to provide a poultry bedding litter which, after use as a litter, provides a natural or organic source of animal food or fertilizer with acceptable nutrients and of a more positive environmental character.

Another object of embodiments of this invention is to provide a superior top dressing material which is economically effective due to its low cost and excellent performance in rejuvenating bedding litter which otherwise would perform poorly.

Another object of the present invention is to provide an improved litter bedding and use thereof which includes top dressing of more conventional litter material for providing enhanced litter performance especially concerning ammonia and beetle control.

A further object of this invention is to provide a citrus litter of enhanced usefulness and economical cost through the use of flake material produced as byproduct from commercial citrus extraction.

These and other objects and advantages of the present invention will be understood from the following description according to preferred embodiments of the present invention, relevant information concerning which is shown in the accompanying drawings.

DESCRIPTION OF THE PREFERRED EMBODIMENTS

Figure 1:
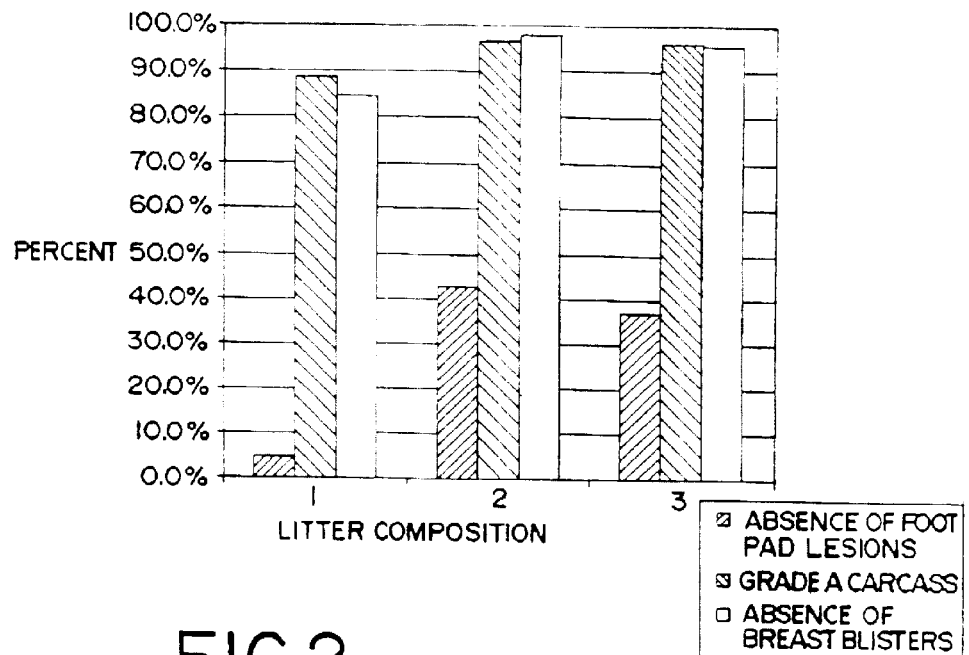
FIG. 1 is a bar graph plot of test results from an efficacy study of different litter materials on broiler performance, illustrating the percent of birds with carcass Grade A rating and the percent of birds without foot pad lesions or without breast blisters.

In commercial-scale poultry raising or growing operations, the poultry often are restricted to confined spaces for reasons which are well appreciated and are of economic value. Typically, the areas on which the growing poultry stand or rest are generally horizontal and can be considered to be floor surfaces. A material having a degree of absorption properties is spread onto these floor surfaces. That material is referred to as a litter, a bedding, or a bedding litter, these terms being used generally interchangeably herein. In a typical operation, each confined space can take the form of a house or pen within which the birds are confined for all bodily functions, including feeding and waste elimination. Feeding typically is carried out with feeders or containers of feed accessible to the birds and drinker mechanisms, some of which are designed to limit spillage.

Each confined area is intended to be used for raising multiple groups of poultry chicks throughout each year. In effect, one group of chicks is cycled through the confined area until a target is achieved. Typically, the target is a selected number of days of feeding. Other possible approaches can be tied to weight, size or other indication of when a bird achieves the desired level of maturity.

Once the selected benchmark has been reached, the adult birds are processed in a manner known in the art. This includes noting weight gain parameters. Also included are objective inspection of the birds for certain imperfections, and grading of the poultry, typically according to government-imposed standards or criteria.

Imperfections which are monitored include so-called foot pad lesions. This includes inspecting the pad of each foot of each bird and recording a foot pad score. In a typical inspection, a score of "3" indicates that a large, open sore lesion was detected on the pad. A score of "2" indicates that a smaller lesion is present. A score of "1" indicates pad burn (dermis), while a score of "0" indicates both foot pads are normal. In many situations, a score of "0" or "1" indicates poultry which is suitable for sale.

Breast blisters can develop, especially at the locations at which the lower portions of the bird breast typically will contact the soiled litter. In a typical inspection for breast blisters, a breast blister score of "2" indicates a large blister of greater than ¼ inch. A score of "1" indicates a smaller breast blister of not larger than ¼ inch. A breast blister score of "0" indicates that no breast blisters were detected on the bird.

The United States Department of Agriculture provides standards for poultry grading. These are generally available and known in the art. They comprise typical carcass grades of Grade A, Grade B and Grade C. For most applications for human consumption, Grade A is required. In addition, the lower grades have lesser economic value than those of the Grade A variety.

It is suggested that the state of the bedding litter can substantially affect conditions such as foot pad lesions, breast blisters, and the USDA Grade. It has been observed that the degree of negative impact on these indicators of bird quality relates to the level of ammonia in bedding litter during the course of its use. When ammonia levels increase unchecked, ammonia toxicity levels can be reached. Ammonia toxicity in commercial poultry operations has been linked to poultry blindness and dermatitis and to rejection of mature birds delivered to processors.

Bedding litter also can provide a breeding ground for insects and deleterious microorganisms. So-called litter beetles or darkling beetles cause substantial damage in poultry raising operations. Bacterial populations are reduced with improved bedding litter performance. Excessive moisture retention in soiled bedding litter compromises bird health.

Poor bedding litter performance can be manifested in deteriorating overall bird health. Besides the readily apparent negatives of raising birds which have health problems, such as mortality, it is recognized here that a more healthy environment enhances the efficiency with which poultry feed is converted to poultry weight.

Unsuitable bedding litter can lead to deterioration of litter in many ways. Deteriorated litter can lead to poultry air sack damage. Bacterial infections and lung collapse can result from poor litter.

Bedding litter compositions of this invention have the ability to reduce ammonia formation. Reduced pH levels and lower pen moisture are beneficial effects of the invention.

The bedding litter compositions also include advantageous components which have biological activity believed to be positive for poultry within the environment of the bedding litter composition. This activity can negate many of the bedding deterioration effects noted herein. Examples of bedding litter components in this regard include one or more of the following components and indicated biological activity or activities which are presently believed to contribute positively to poultry housed within an environment having a litter containing such component(s). Each component typically is found in dried citrus peel or pulp byproduct or waste from citrus fruit extraction facilities.

Pectin and demethylated pectin are believed to effectively bind ammonia, resulting in a reduction of gaseous ammonia. These are useful components of bedding litter compositions. Used litter having enhanced bound ammonia content provides a natural nitrogen source for fertilizers, for example. Such can be a source of slow-release nitrogen when incorporated into agricultural fertilizer such as for horticultural applications.

Cellulose, hemicellulose and starch are components contributing moisture absorption and release functions in soiled bedding. Their inclusion in dried flaked citrus byproduct provides benefits of this type.

Food grade acids such as citric acid and malic acid are acidifiers for enhancing general bird health. Such acids are found in citrus byproduct or waste from citrus extraction facilities.

Antioxidants can positively impact bird health, including ascorbic acid, carotenoids, beta-carotene, beta-cryptoxanthin, lycopene, and xanthophylls. Citrus byproducts provide some or all of these. They can be especially accessible in dried flake citrus byproduct according to a preferred embodiment of the invention.

Antimicrobial activity, antiviral activity, and general bird health are positively addressed by litter composition components from citrus byproducts which are flavonoids including naringin, naringenin, naritutin, hesperidin and hesperetin as well as polymethoxylated flavones including sinensetin, tangeretin and nobiletin.

Tocopherols as litter components promote general bird health and are believed to be of assistance in controlling odor of soiled litter. These are available from citrus peel byproduct material.

Antimicrobial and/or insect antifeedant activities or insecticidal activities are believed to be provided by litter components including limonin, nomolin, limonin glucosides, and d-limonene. Each is provided by citrus byproduct such as citrus peel and pulp flake.

A readily available and relatively inexpensive source of many to all of these components is dried citrus product which can be citrus peel or pulp byproduct or waste which is dried in accordance with generally known industry practices. This is dried citrus byproduct. It is a preferred component for the subject bedding litter compositions. Dried citrus byproduct incorporates one, some, many or all of the components noted above and elsewhere herein. For economic and positive environmental and organic reasons, the components can be used as is and without requiring extraction, purification or isolation. They can be provided in their native state and in the valuable combinations already present in dried citrus peel and pulp.

In addition to incorporating such beneficial components in a very readily available and inexpensive source, such dried citrus peel sources have organic qualities and break down organically after removal from poultry houses as a component of used litter. When dried citrus peel is incorporated in the bedding litter composition, the used composition provides organic fertilizer which is environmentally responsible for spreading on agricultural fields, having no added chemicals such as biocides or antibiotics. This does have agriculturally important sources of nitrogen and other plant nutrients. This used litter composition also provides an environmentally responsible feed stock, such as for ruminants.

Ammonia present in poultry pens is bound by the bedding components, typically by way of chemical bonding. A good source of organic nitrogen for fertilizer or feed thus is provided. Concerning phosphorus present in the bedding, there is a substantially reduced amount of soluble phosphorous. This lessens potential environmental run-off issues, whether the used litter is later used in feed or fertilizer.

While one or more of these natural components can be for use in a poultry litter composition, a very economical source of these is the citrus peel or citrus pulp which is a voluminous byproduct of citrus juice extraction operations. This citrus waste material is typically dried as citrus waste material that is widely varying or heterogeneous in terms of components, particle sizes and even shapes. Typical dried citrus waste material is composed of primarily large particles having a general length or width or size of about ½ inch or greater, while also including a relatively low volume of fine particles.

As used herein, this heterogeneously sized dried citrus waste material is referred to as being flaked. This flaked dried citrus byproduct can include fine particles on the order of 1% by weight, usually less than 10% by weight, with at least 10% by weight of irregularly shaped particles in excess of ¾ inch in size. Typical moisture contents of this flaked dried citrus byproduct range between about 5 and about 12 weight percent moisture, based upon the total weight of the byproduct, typically between about 7 and 11 weight percent. Where greater moisture reduction cost is acceptable, a moisture content of between about 8 and 9 weight percent can be practiced.

There is no need to resize or uniformly shape the flaked dried citrus byproduct. It can be used as the product of traditional citrus residue processing into so-called dried pulp. This typically includes a so-called liming process in which the raw, wet citrus residue is treated with calcium oxide ("quicklime"), pressed and dried into loose dried pulp. This can serve as the dried citrus byproduct as used herein. Details on the production of this loose dried pulp can be found in Braddock, *Handbook of Citrus By-Product and Processing Technology*, Chapter 10, "Dried Pulp, Pellets and Molasses," pages 135–148, incorporated by reference hereinto.

It is believed that this liming demethylates or de-esterifies pectin present in the loose dried pulp at about 30 weight percent of the dry matter. This demethylated pectin is favorable for binding ammonia in the bedding litter according to the invention.

This citrus byproduct, whether individual components or as a naturally occurring combination or complex mixture of the litter components according to preferred embodiments of the invention, can be combined with other traditional bedding litter materials. In the present bedding litter compositions, these are secondary litter materials, including shaved pine, wood chips, sugarcane bagasse, oat hulls, and the like. Often these secondary bedding litter materials will be much more homogeneous in particle size when compared with most sources of citrus waste material or the citrus byproduct hereof. Often they will be dried. Secondary litter materials include wood or woody plant originating materials such as soft wood shavings and sawdust, hardwood shavings and sawdust, softwood chips, hardwood chips and processed paper. Vegetation sources include bagasse rice hulls, oat hulls, peanut hulls, crushed corn cobs, chopped straw, hay or corn stover. These can be used in combination.

Generally, the citrus byproduct (whole composition or components thereof) comprises from about 10 to about 100 volume percent of the total bedding litter composition. The secondary litter sources, when included, will comprise between about 0 and about 90 volume percent of the total bedding litter composition. Other such compositions can have at least rout 15 volume percent citrus byproduct and up to about 85 volume percent secondary litter sources. Typically, the compositions have at least about 20 volume percent citrus and up to about 80 volume percent secondary sources.

In some applications, the citrus component(s) and the secondary bedding litter component(s) will be directly blended together as a mixed bedding composition. In other instances, the citrus component(s) will be spread over the secondary bedding litter components to function as a so-called top dressing. In some applications, litter material is recycled for use (often for one or more additional growing regimens), and fresh or reused citrus component(s) can be thus combined. When a top dressing approach is practiced, this can provide an exceptionally economical manner of dramatically enhancing the performance of litter materials which are top dressed, even when they were previously used as bedding litter or would otherwise perform in a mediocre manner.

Certain enhancements of the present poultry bedding litter over traditional cellulosic poultry bedding litter are illustrated by the following.

EXAMPLE 1

A study was conducted to evaluate bedding litters within pens of the type typically used in poultry raising facilities. The testing was carried out over a typical growing period for broiler chickens, while monitoring certain parameters of importance to the poultry industry. The testing protocol strove to maintain all environmental, feeding and other conditions consistent for all birds, with the exception of the bedding litter composition.

Study Protocol

In accordance with typical industry practices, the diets for each pen were as follows. For days 0 through 19, the birds were given a 22% starter diet in crumbled form, the balance of to feed being typical basal feed material. For early feeding, 4,000 pounds of feed containing a coccidiostat feed additive (salinomycin at 50 grams per ton) were prepared. During days 19 through 35, a grower diet containing 20% pelleted grower feed formulation was combined with the basal feed containing the same feed additives and feed additive concentrations as in the starter diet. 8,500 pounds of this grower diet were prepared. A finisher diet was fed from day 35 to day 49, the final day of the study. 12,000 pounds of this feed was formulated to include 18% finisher diet in pelleted form, balance being basal feed, no feed additives being used at this finisher stage.

The species involved in the testing was broiler chicken of commercial production strain and Cobb x Cobb breed, the supplier being Cobb-Vantress, Inc. of Cleveland, Ga. The birds were supplied as male and 1 day of age upon receipt (day 0 in the study). Pen cards were used for identification. The total number of pens used in the study was 39, with approximately 52 birds being in each pen at the initiation of the study. At day 7, each pen was targeted to have 50 birds, three different bedding litter compositions were used, and each composition was experienced by a target of 650 birds, there being 13 pens for each litter composition.

The compositions were assigned to individual pens using a complete randomized block design, with the composition assigned to each pen being by way of a computer-generated assignment period. Clean concrete floor pens within an environmentally controlled facility were used. All birds were placed on an initially clean litter, and lighting followed a typical commercial program. Within the pens, the floor space was approximately 0.8 square feet per bird. These housing conditions simulated conditions in commercial poultry raising facilities. Plywood barriers were placed between each pen in order to prevent bird migration and minimize litter transfer across pens.

The bedding litter compositions were as follows. Composition 1 was the control, namely 100% pine wood shavings, a typical litter used in commercial poultry raising facilities. Composition 2 was 100% dried citrus byproduct as received from a commercial orange juice extraction byproduct or waste flow treated to dried pulp generally in accordance with Chapter 10 of Braddock, *Handbook of Citrus By-Products and Processing Technology*. Composition 3 was a 50:50 (volume %/volume %) blend of Composition 1 and Composition 2.

The birds were vaccinated for Mareks at the hatchery, and they were vaccinated for Newcastle and Infectious Bronchitis (NCB) at approximately 7 days of age by addition to the drinking water. Water was provided *ad libitum* throughout the study by way of a single automatic 14-inch diameter bell drinker within each pen. For approximately the first 5 days of age, a floor-placed gallon drinker also was placed in each pen to facilitate access by the ,small chicks. A clean and constant water supply was provided to the birds.

The feed was provided ad libitum throughout the study by way of two 17 inch diameter hanging tube feeders within each pen. A chick feeder tray also was placed in each pen for approximately the first 5 days. All feed added and removed from the pens was weighed and recorded.

Litter samples were collected from each pen within the time frame of the end of the study for analysis purposes. Samples were collected from six locations in each pen (approximately 40 grams each), two samples being from the front of the pen, two samples being from the back of the pen, one sample being from between the bell drinker and the front feeder, and one sample being collected from between the bell drinker and the back feeder. All six samples from each pen were combined and mixed well. An approximately 100 gram sample from each was segregated to test for total coliform counts. The remaining samples from each pen containing the same litter composition were combined and mixed. This composite sample for each composition was collected for analysis of total nitrogen (Kjeldahl method) and nutrient composition (crude protein, crude fiber, crude fat and calcium).

The test facility, pens and birds were observed at least twice daily for general flock condition, lighting, water, feed, ventilation, daily maximum and minimum temperatures, and any unanticipated events. These observations included noting any apparent bedding litter consumption by the birds, none being observed.

Mortalities or removals occurred occasionally, such being removed from the pen and necropised to determine probable cause of death. Birds were weighed on a pen basis on approximately day 16 and day 49 periods. On about day 18, foot pads of the birds were spot-checked for any lesions at each body weight measurement, and performance data were summarized by average weight per bird on a pen basis. The average feed conversion was calculated using the total feed consumption in a pen (for that period) divided by the total weight of surviving birds. Adjusted feed conversion was calculated using the total feed consumption in a pen divided by the total weight of surviving birds and the weight of birds that died or were removed from that pen.

Carcass Quality Results

The quality of each carcass was determined in accordance with the following. The USDA Grade of each carcass was recorded as A, B or C. A foot pad score for each individual was determined as follows: An individual having no burn, scab or lesion on its foot pad was scored as normal ("0"). A dermis only foot pad burn was recorded as a "1" reading. An individual having a pad scab (indicating healing) on one or both feet was given a "2" score. An individual having a pad lesion (open sore) on one or both feet was given a "3" score. When no breast blisters were present on an individual, a score of "0" was given. A small (equal to or less than ¼ inch) breast blister was given a score of "1", and a larger (greater than ¼ inch) breast blister was given a score of "2".

At the end of the study, abdominal fat pads were collected from one randomly selected bird (first bird within reach) from each pen. Fat pads from birds within pens having the same litter composition were combined and sampled for pesticide analysis. No differences were noted among Compositions 1, 2 and 3.

A summary of the day 50 foot pad scores, carcass grades and breast blister scores are provided in Table I.

TABLE I

| | | Number of Birds Per Pen With - | | | | | | | | | |
|---|---|---|---|---|---|---|---|---|---|---|---|
| | No. of Birds | Foot pad Score of: | | | | Carcass Grade of: | | | Breast Blister Score of: | | |
| Litter | Scored | 0 | 1 | 2 | 3 | A | B | C | 0 | 1 | 2 |
| 1 | 45 | 1 | 5 | 21 | 18 | 37 | 5 | 3 | 27 | 14 | 4 |
| Control | 47 | 3 | 11 | 18 | 15 | 42 | 5 | 0 | 42 | 4 | 1 |
| 100% | 47 | 1 | 1 | 10 | 35 | 40 | 7 | 0 | 40 | 6 | 1 |
| Pine wood | 46 | 3 | 3 | 15 | 25 | 41 | 5 | 0 | 41 | 1 | 4 |
| | 43 | 2 | 12 | 19 | 10 | 42 | 0 | 1 | 43 | 0 | 0 |
| Total | 228 | 10 | 32 | 83 | 103 | 202 | 22 | 4 | 193 | 25 | 10 |
| Percent | | 4.4% | 14.0% | 36.4% | 45.2% | 88.6% | 9.6% | 1.8% | 84.6% | 11.0% | 4.4% |
| 2 | 47 | 14 | 20 | 12 | 1 | 43 | 3 | 1 | 44 | 2 | 1 |
| 100% | 46 | 21 | 11 | 13 | 1 | 46 | 0 | 0 | 46 | 0 | 0 |
| citrus peel | 45 | 23 | 8 | 10 | 4 | 44 | 1 | 0 | 44 | 1 | 0 |
| | 43 | 17 | 12 | 7 | 7 | 42 | 1 | 0 | 43 | 0 | 0 |
| | 44 | 21 | 10 | 11 | 2 | 43 | 0 | 1 | 44 | 0 | 0 |
| Total | 225 | 96 | 61 | 53 | 15 | 218 | 5 | 2 | 221 | 3 | 1 |
| Percent | | 42.7% | 27.1% | 23.6% | 6.7% | 96.9% | 2.2% | 0.9% | 98.2% | 1.3% | 0.4% |

TABLE I-continued

| | | Number of Birds Per Pen With - | | | | | | | | | |
|---|---|---|---|---|---|---|---|---|---|---|---|
| | No. of Birds | Foot pad Score of: | | | | Carcass Grade of: | | | Breast Blister Score of: | | |
| Litter | Scored | 0 | 1 | 2 | 3 | A | B | C | 0 | 1 | 2 |
| 3 | 47 | 10 | 12 | 22 | 3 | 43 | 3 | 1 | 40 | 5 | 2 |
| 50:50 | 48 | 21 | 13 | 14 | 0 | 47 | 1 | 0 | 47 | 1 | 0 |
| Pine Wood/ | 44 | 23 | 14 | 7 | 0 | 44 | 0 | 0 | 44 | 0 | 0 |
| Citrus peel | 46 | 18 | 5 | 18 | 5 | 44 | 2 | 0 | 45 | 1 | 0 |
| | 47 | 14 | 7 | 14 | 12 | 45 | 2 | 0 | 47 | 0 | 0 |
| Total | 232 | 86 | 51 | 75 | 20 | 223 | 8 | 1 | 223 | 7 | 2 |
| Percent | | 37.1% | 22.0% | 32.3% | 8.6% | 96.1% | 3.4% | 0.4% | 96.1% | 3.0% | 0.9% |

From these data it is noted that 96.9% of the birds on litter Composition 2 were Grade A, and 96.1% of the birds on Composition 3 were Grade A. Only 88.6% of the birds on control Composition 1 were Grade A. While only 4.4% of the birds on control Composition 1 were without foot pad lesions, 42.7% of the birds on Composition 2 and 37.1% of the birds on Composition 3 were without foot pad lesions. 84.6% of the birds on Composition 1 were without breast blisters, while 98.2% of the birds on Composition 2 and 96.1% of the birds on Composition 3 were without breast blisters. These data are presented in bar graph form in FIG. 1.

Figure 2:
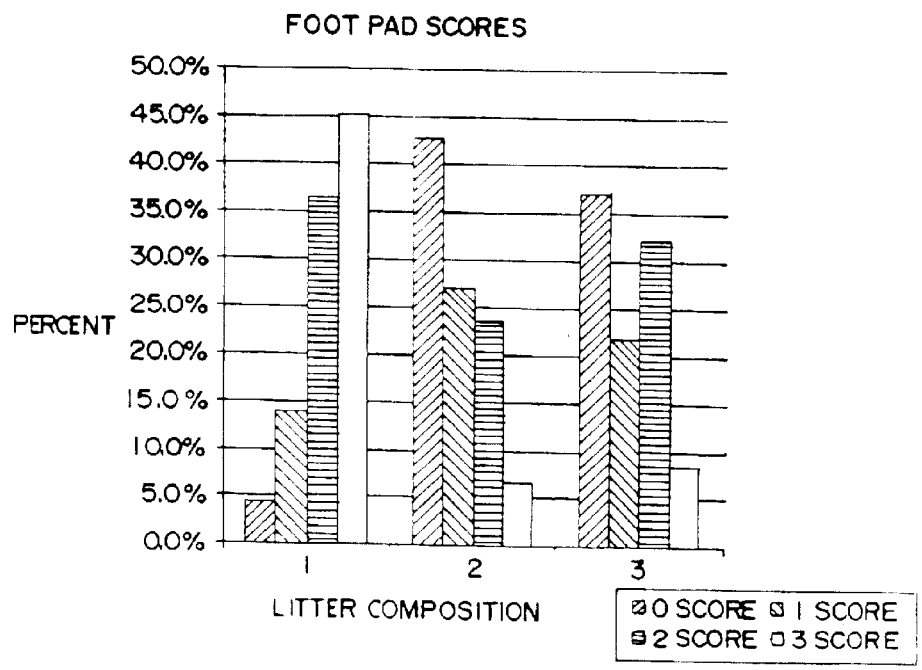
FIG. 2 is a bar graph plot of data of foot pad scores from a poultry litter efficacy study noted in Example 1.

With reference to the foot pad lesion scores of Table I, it will be noted that a strong majority of the birds on litter Composition 1 had a foot pad score of 2 or 3. The average foot pad score of all of the birds on control Composition 1 was 2.20. By contrast, the average foot pad score for birds on Composition 2 was 0.93 and for Composition 3 was 1.14. The percentages of these foot pad scores are set out in bar graph form in FIG. 2. Furthermore, the total percentage of good scores of "0" or "1" was only 18.4% for Composition 1. It was 69.8% for Composition 2 and 59.1% for Composition 3.

Figure 3:
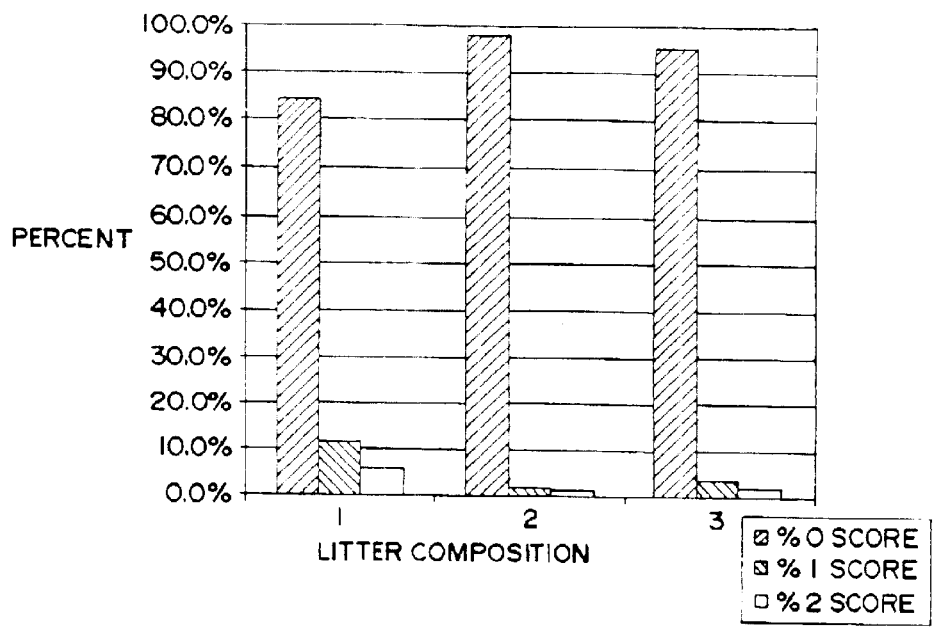
FIG. 3 is a bar graph plot of breast blister scores from the poultry litter efficacy study of Example 1.

The breast blister score data reported in Table I are set out in bar graph form in FIG. 3. 15.4% of the birds on control litter Composition 1 had breast blisters, whereas only 1.7% of those on Composition 2 and 3.9% on those of Composition 3 had evidence of breast blisters. The average score for Composition 1 was 0.20, while that for Compositions 2 and 3 were 0.02 and 0.05 respectively.

Concerning the carcass grade scores, a Grade A indicates a "0" score, and Grade B indicates a "1" score, and a Grade C indicates a "2" score. Composition 1 had a carcass grade score of 0.13, while each of Compositions 2 and 3 had a carcass grade score of 0.04.

Observations noted that Composition 1 had a noticeable "chicken barn" odor, while Compositions 2 and 3 had an odor neutralizing effect indicated by the lack of such odor at the end of the test period. By the end of the study, all pens' litter was slick and caked over, indicating that the wetting effect of the bell drinkers provided excess water on the litter and a substantial opportunity for ammonia development. Mortality levels the acceptable range. Composition 1 had a compost state, while Compositions 2 and 3 still citrus byproduct which was still of its original or the most part.

Feed Conversion Results

Performance data for birds at 16 days of age are reported in Table II.

TABLE II

| | | Number of birds | | | Bird Ave. | Feed | Adjusted Feed |
|---|---|---|---|---|---|---|---|
| Litter | Started | Mortality | Removed | Weighed | Wt. (kg) | Conversion | Conversion |
| Control | 50 | 1 | 0 | 49 | 0.451 | 1.262 | 1.242 |
| 100% Pine Wood | 50 | 1 | 0 | 49 | 0.459 | 1.276 | 1.244 |
| | 50 | 0 | 0 | 50 | 0.506 | 1.229 | 1.216 |
| | 50 | 0 | 0 | 50 | 0.458 | 1.271 | 1.256 |
| | 50 | 1 | 0 | 49 | 0.469 | 1.226 | 1.206 |
| | 50 | 0 | 0 | 50 | 0.464 | 1.237 | 1.228 |
| | 50 | 0 | 0 | 50 | 0.496 | 1.210 | 1.201 |
| | 50 | 0 | 0 | 50 | 0.480 | 1.221 | 1.213 |
| | 50 | 0 | 0 | 50 | 0.490 | 1.204 | 1.194 |
| | 50 | 1 | 0 | 49 | 0.492 | 1.249 | 1.230 |
| | 50 | 1 | 0 | 49 | 0.482 | 1.271 | 1.247 |
| | 50 | 3 | 0 | 47 | 0.494 | 1.237 | 1.184 |
| | 50 | 0 | 0 | 50 | 0.482 | 1.237 | 1.223 |
| Total & Average | 650 | 8 | 0 | 642 | 0.479 | 1.241 | 1.222 |
| 100% Citrus Peel | 50 | 0 | 0 | 50 | 0.440 | 1.245 | 1.231 |
| | 50 | 0 | 0 | 50 | 0.442 | 1.258 | 1.250 |
| | 50 | 0 | 0 | 50 | 0.474 | 1.228 | 1.218 |

TABLE II-continued

| Litter | Number of birds | | | | Bird Ave. Wt. (kg) | Feed Conversion | Adjusted Feed Conversion |
| --- | --- | --- | --- | --- | --- | --- | --- |
| | Started | Mortality | Removed | Weighed | | | |
| | 50 | 1 | 0 | 49 | 0.486 | 1.223 | 1.200 |
| | 50 | 1 | 0 | 49 | 0.465 | 1.215 | 1.186 |
| | 50 | 0 | 0 | 50 | 0.444 | 1.257 | 1.243 |
| | 50 | 0 | 0 | 50 | 0.456 | 1.250 | 1.241 |
| | 50 | 0 | 0 | 50 | 0.504 | 1.167 | 1.154 |
| | 50 | 1 | 1 | 48 | 0.494 | 1.211 | 1.190 |
| | 50 | 0 | 0 | 50 | 0.508 | 1.173 | 1.161 |
| | 50 | 0 | 0 | 50 | 0.482 | 1.216 | 1.204 |
| | 50 | 1 | 0 | 49 | 0.486 | 1.210 | 1.190 |
| | 50 | 1 | 0 | 49 | 0.476 | 1.215 | 1.197 |
| Total & Average | 650 | 5 | 1 | 644 | 0.474 | 1.221 | 1.205 |
| 50:50 Pine Wood/ Citrus Peel | 50 | 1 | 0 | 49 | 0.453 | 1.288 | 1.272 |
| | 50 | 1 | 0 | 49 | 0.467 | 1.258 | 1.230 |
| | 50 | 0 | 0 | 50 | 0.486 | 1.243 | 1.234 |
| | 50 | 1 | 0 | 49 | 0.488 | 1.243 | 1.219 |
| | 50 | 0 | 0 | 50 | 0.480 | 1.221 | 1.213 |
| | 50 | 2 | 0 | 48 | 0.479 | 1.217 | 1.195 |
| | 50 | 0 | 0 | 50 | 0.496 | 1.194 | 1.185 |
| | 50 | 0 | 0 | 50 | 0.516 | 1.178 | 1.170 |
| | 50 | 1 | 0 | 49 | 0.473 | 1.198 | 1.180 |
| | 50 | 1 | 0 | 49 | 0.496 | 1.230 | 1.204 |
| | 50 | 0 | 0 | 50 | 0.514 | 1.191 | 1.181 |
| | 50 | 0 | 0 | 50 | 0.446 | 1.238 | 1.227 |
| | 50 | 0 | 0 | 50 | 0.502 | 1.215 | 1.202 |
| Total & Average | 650 | 7 | 0 | 643 | 0.484 | 1.224 | 1.209 |

Figure 4:
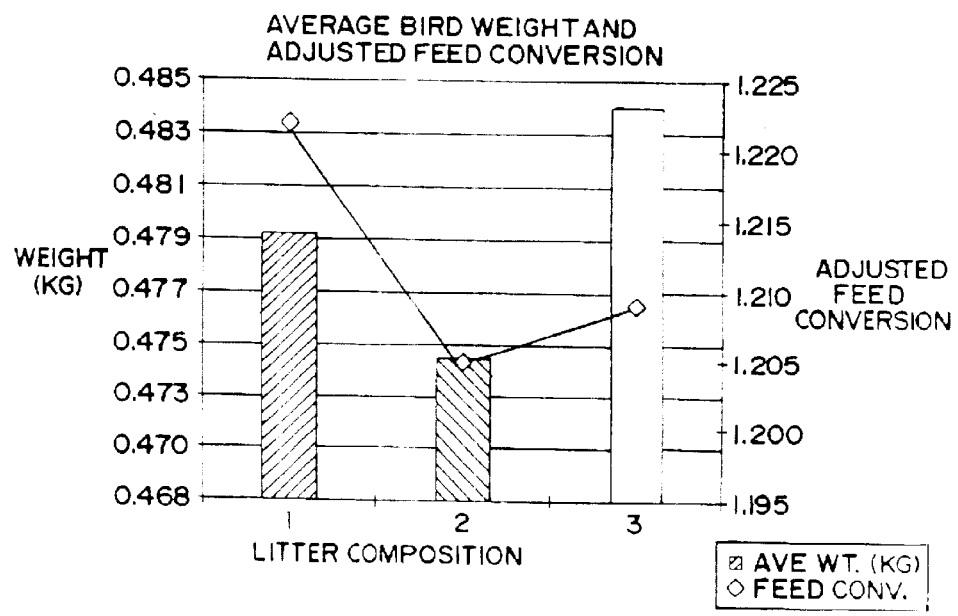
FIG. 4 is a plot of short-term average bird weight and adjusted feed conversion data from an initial period of the litter material efficacy study in Example 1.

For control litter Composition 1, the average bird weight at day 16 was 479 kilograms. For litter Composition 2, the average bird weight at day 16 was 0.474 kilograms. For birds on litter composition 3, the average bird weight was 0.484 kilograms. When the total feed consumed by these birds was divided by this total bird weight for birds on each respective litter composition, the feed conversion was determined. An adjusted feed conversion is determined by including the weight of birds that died or were removed in order to take into consideration the actual amount of feed converted into bird weight. The resulting adjusted feed conversion at day 16 was 1.222 for the birds raised on control litter Composition 1, while those on either litter Composition 2 or 3 considerably lower at day 16, 1.205 and 1.209, respectively. This illustrates that, with litter Compositions 2 or 3, significantly less feed was required to attain bird weight of the birds raised on control litter Composition 1. These average weight and adjusted feed conversion values are set out in visual form in FIG. 4.

Ammonia Levels

At the end of the study of this Example 1, litter was removed from one pen of each composition, placed into plastic bags that were sealed, and then placed into 30-gallon containers or barrels without lids. These containers sat overnight at room temperature. Ammonia levels in each sealed bag were then measured using a Matheson toxic gas detector, Model 8014KA and Precision gas detector tubes #105SC (5–260 ppm). The ammonia levels of Composition 1 were in excess of 260 ppm (the maximum reading possible using these gas detector tubes). For Composition 2, the ammonia level was approximately 10 ppm, and for Composition 3, the ammonia level was approximately 20 ppm.

This testing was essentially repeated, except this time Precision gas detector tubes #105SB (50–900 ppm) were used. The barrels were closed and sealed and placed within an environment at about 90° F. Ammonia readings were taken from each barrel 24 hours and 48 hours later. For Composition 1, the average ammonia reading at 24 hours was 783 ppm, and at 48 hours it was 763 ppm. For Composition 2, the average ammonia reading was 27 ppm at both 24 hours and 48 hours. For Composition 3, the average ammonia reading at 24 hours was 176 ppm, while at 48 hours the average ammonia reading was 177 ppm. Thus, compared to control Composition 1, litter Composition 2 reduced the ammonia levels by about 96%, and litter Composition 3 reduced the ammonia levels by about 77%.

Coliform Counts

Coliform counts were taken from the litter samples at the end of the study reported in this. Example 1. The number of gram negative bacteria per gram of litter was recorded for each pen. The average numerical value for control Composition 1 was 2,279,231, or $2.3 \times 10^6$. For litter Composition 2, the average count number was 1,197,000, or $1.2 \times 10^6$. For litter Composition 3, the average count number was 972,592, or $9.7 \times 10^5$.

Nutrient and Nitrogen Analysis

At the end of the study of this Example 1, consolidated litter samples were subjected to nutrient and nitrogen analysis. These included moisture as received by the testing facility, moisture at assay, nitrogen in accordance with the Kjeldahl procedure, fat percent by acid hydrolysis, crude fiber, potassium, calcium, total phosphorus, and water soluble phosphorus, using Dionex IC water soluble phosphate, ortho-phosphate. The test results data are reported in Table III.

TABLE III

ANALYSES OF SOILED POULTRY LITTER

| Assay (Analyte) | Composition 1 | Composition 2 | Composition 3 | 2 vs. 1 |
|---|---|---|---|---|
| Moisture as Received | 40.6% | 33.6% | 35.7% | −17.2% |
| Total Nitrogen | 2.10% | 2.60% | 2.43% | +23.8% |
| Protein (N × 6.25) | 16.1% | 20.6% | 18.2% | +28.0% |
| Fat (acid hydolysis) | 2.43% | 3.06% | 2.99% | +25.9% |
| Crude Fiber | 11.42% | 11.0% | 10.4% | −3.7% |
| Potassium | 14,633 ppm | 13,833 ppm | 14,166 ppm | −5.5% |
| Calcium | 1.55% | 1.46% | 1.57% | −5.8% |
| Total Phosphorus | 1.093% | 0.826% | 0.919% | −24.4% |
| Water Soluble Phosphorus | 0.130% | 0.078% | 0.082% | −39.9% |

In Table III, the moisture as received was the percent of native moisture content of the soiled litter, and the protein was the percent protein plus bound ammonia. The following observations can be made.

Litter Composition 2 had a moisture reduction of 17.2% over control litter Composition 1. This indicates that the citrus byproduct Composition 2 facilitated release of moisture within the pens, apparently due to evaporation within the poultry facility. Total nitrogen content of litter Composition 2 showed an increase of 23.8% over the control litter Composition 1. There was a 28% increase of Composition 2 over Composition 1 in calculated protein content. This indicates more effective ammonia binding by the citrus byproduct litter, further indicating enhanced ammonia control within the pens. This also indicates enhanced value as a feedstock, such as for ruminants, and as fertilizer having a desirable nitrogen content.

The total phosphoreus content was 24.4% lower for litter Composition 2 when compared with control Composition 1, and the water soluble phosphorus was reduced 39.9% by Composition 2 when compared with the control. These data indicate that the citrus byproduct litter has environmental advantages. Reduced phosphorus levels, especially of the water soluble variety, indicate a reduced phosphorus pollution risk should the used litter be put in a position were run-off is an issue, such as when used litter could be used as feed or fertilizer.

EXAMPLE 2

Another study was conducted to evaluate previously used bedding litters within pens of the type typically used in poultry raising facilities. The testing was carried out generally in accordance with Example 1 and included an additional analysis concerning a further matter of importance to the poultry industry, darking beetle and beetle larva populations. The testing protocol strove to maintain all environmental, feeding and other conditions consistent for all birds, with the exception of the bedding litter composition.

The study protocol was essentially as in Example 1, except the total number of pens used in the study was 40, with approximately 52 birds being in each pen at the initiation of the study. At day 7, each pen was targeted to have 50 birds, three different bedding litter compositions were used, and each composition was experienced by a target of 500 birds, there being 10 pens for each litter composition.

Soiled or used litter material from Example 1 was used for this study. The bedding litter compositions were as follows. Composition 1 was the control, namely 100% used pine wood shavings, a typical litter used in commercial poultry raising facilities which often reuse soiled litter. Composition 2 was a 50:50 (volume %/volume %) blend of used pine and citrus litter. Composition 3 was 100% soiled or used citrus litter from Example 1. Composition 4 was 80% used pine shavings litter and 20% used citrus peel litter. This Composition 4 was obtained by mixing 1 part of used 50/50 mixture with 1.5 parts of used 100% pine shavings, both as recycled from the Example 1 tests.

The birds were vaccinated for Mareks at the hatchery, and they were vaccinated for Newcastle and Infectious Bronchitis (NCB) at 17 days of age by spray application. Water was provided ad libitum throughout the study by way of a five automatic nipple drinkers within each pen. For approximately the first 4 days of age, a floor-placed gallon drinker also was placed in each pen to facilitate access by the small chicks. A clean and constant water supply was provided to the birds.

The feed was provided ad libitum throughout the study by way of two 17 inch diameter hanging tube feeders within each pen. A chick feeder tray also was placed in each pen for approximately the first 6 days. All feed added and removed from the pens was weighed and recorded. The amount available of each diet (starter, grower, finisher) was fed to completion, and the next diet was added on top of the diet remaining in the feeder. The feed remaining in the feeders was weighed and recorded on day 49, concurrent with body weight measurement. Birds were weighed on a pen basis on day 49.

The quality of each carcass was determined in accordance with Example 1. On day 50, the day after final weights wee obtained, all birds in five pens of each litter composition were removed for carcass quality scoring. No statistically significant differences were observed for foot pad score or carcass grades. There were minor significant differences with the breast blister scores. These mixed results were believed to be the result of unusually low pen ammonia levels due to high levels of pen ventilation required due to unusually high ambient temperatures during the study.

Overall, there were no significant differences among the treatments in body weights, feed conversion, adjusted feed conversion and mortality at 49 days of age. Mortality during the first seven days was within the expected range. Mortality during days 7–49 was higher than normal; however, there were no significant differences among the treatment groups.

Moisture Levels

Moisture analysis was conducted on a sample of litter (less than about 60 grams) from each pen on days 0 and 49. The samples were weighed and then placed in a convection drying oven. Samples were dried for about 24 hours at about 100° C. The samples then were weighed and the percent moisture calculated. On day 23, litter from three pens of each composition was sampled and moisture determined in the same manner.

Litter moisture levels on day 0 show that all treatments started out with similar levels. At day 23 the used 100% citrus peel litter had the lowest average litter moisture level at 24.5%, while the 100% used pine had the highest at 38.4%. The 50/50 used mixture had a 31.2% average moisture level, and the 80/20 used mixture was at 30.8%. On day 49 the treatment average litter moisture levels ranged from 25.1% (100% used citrus litter) to 35.0% (100% used pine litter). The used 80/20 pine/citrus litter was at 31.8% and the used 50/50 citrus/pine litter had an average moisture level of 28.0%.

Ammonia Levels

Ammonia levels in the air at approximately six inches above the litter were measured in four pens of each litter composition (16 measurements at each of eight different periods) Measurements were taken on days 0, 1, 2, 3, 7, 14, 21 and 49. Ammonia levels were measured using a Matheson Toxic Gas Detector, Model 8014KA and Precision Gas Detector Tubes #105SC(5–260 ppm).

At study end, approximately 20 kg of used litter material was removed from seven pens of each litter composition and placed into a 32 gallon plastic barrel. An approximately ¼ inch hole was drilled in the side of each barrel approximately 6 inches above the top of the litter. The hole was covered with duct tape and the lids were taped down. The barrels were placed into a trailer which was heated to about 90° F. At 24 and 48 hours after placing the barrels of litter into the heated trailer, ammonia readings were taken through the predrilled holes. The readings were taken using a Matheson Toxic Gas Detector, Model 8014KA and Precision Gas Detector Tubes 105SC (5–260 ppm or 50–900 ppm).

The ammonia levels in the test facility are presented in Table IV for days 0, 1, 2, 3, 7, 14, 21 and 49. During the first three weeks of the study, the 100% used citrus and 50/50 used pine/citrus groups had significantly lower ammonia levels at several of the measurement periods. At the end of the study the level of ammonia in each case was very similar. Because the ambient temperature was very hot (several 90° F. days during the study), it was necessary to run the ventilation full time during most of the study. This resulted in any build up of ammonia being dissipated from the facility and, therefore, treatment effects were difficult to determine.

TABLE IV

Average Ammonia Readings (PPM) on Study Day

| Day | 0 | 1 | 2 | 3 | 7 | 14 | 21 | 49 |
|---|---|---|---|---|---|---|---|---|
| 100% Pine | 21 | 44 | 28 | 43 | 25 | 13 | 23 | 26 |
| 50/50 | 6 | 16 | 10 | 23 | 24 | 20 | 14 | 34 |
| 100% Citrus | 0 | 20 | 6 | 10 | 14 | 9 | 11 | 28 |
| 80/20 | 21 | 41 | 25 | 20 | 28 | 14 | 23 | 31 |

Beetle and Larvae Counts

On study day 2, beetle larvae were placed in each pen by the following procedures. Ten five-gallon buckets were filled about half full with used beetle-infested litter taken from under poultry feeders. The litter in each bucket was mixed before removing each scoop. From each bucket, one scoop went to pens of each litter composition. The scoop of litter was placed under the front feeder of each pen.

On day 42, a beetle collection chamber (PVC pipe, about 1 inch in diameter and about 8 inches long) was placed in the litter under the front feeder in each after pens of each composition. On day 49, the collection chambers were removed. The number of beetles (adults and larvae) present in each chamber were counted and recorded. For the 100% used pine litter (Composition 1), the average count was 19 beetles and 233 larvae. For Composition 2, 50/50 used pine and used citrus litter, the count was 24 beetles and 156 beetle larvae. For Composition 3, 100% used citrus litter according to the invention, the average counts were 9 beetles and 43 beetle larvae. For Composition 4, the 80/20 litter having 80% used pine litter and 20% used citrus litter, the average counts were 20 beetles and 232 beetle larvae.

From these darkling beetle counts, it is noted that the Compositions 2 and 3 (100% and 50% used citrus litter compositions) had significantly fewer adult and larval stage beetles than did Compositions 1 and 4 (100% and 80% used pine shavings litter). More specifically, the 100% used citrus litter showed an approximate 80% reduction in larval count compared with either Compositions 1 or 4. The 50% used citrus litter showed an approximate 30% reduction in larval count compared with either Compositions 1 or 4.

Coliform Counts

Coliform counts were taken from the litter (300 gram samples) at the end of the study reported in this Example 2. The number of gram negative bacteria (using MacConkey's agar) per gram of litter was recorded for each pen. The average numerical value for control Composition 1 (100% used pine) was 478,185, or $4.8 \times 10^5$. For litter Composition 2 (50/50), the average count number was 8,992, or $9 \times 10^3$. For litter Composition 3 (100% used citrus), the average count number was 44,328, or $4.4 \times 10^4$. For litter Composition 4 (80/20), the average count number was 25,334, or $2.5 \times 10^4$.

Nutrient and Nitrogen Analysis

At the end of the study of this Example 2, consolidated litter samples were subjected to nutrient and nitrogen analysis. These included moisture and pH as received by the testing facility, nitrogen in accordance with the Kjeldahl procedure, protein (N×6.25) fat percent by acid hydrolysis, crude fiber, calcium, potassium, total phosphorus, and water soluble phosphorus (using the Dionex IC ortho-phosphate method). The test results data are reported in Table V.

TABLE V

ANALYSES OF SOILED USED POULTRY LITTER

| Assay (Analyte) | Comp. 1 | Comp. 4 | Comp. 2 | Comp. 3 | 3 vs. 1 |
|---|---|---|---|---|---|
| Moisture | 34.4% | 36.7% | 31.3% | 27.0% | −21.5% |
| PH | 7.41 | 7.60 | 7.58 | 7.44 | — |
| Total Nitrogen | 3.03% | 3.01% | 3.08% | 3.62% | +19.5% |
| Total Protein | 18.9% | 18.8% | 19.3% | 22.6% | +19.6% |
| Total Fat | 4.2% | 4.4% | 4.4% | 5.0% | +20.0% |
| Crude Fiber | 25.4% | 22.3% | 19.2% | 13.5% | −46.8% |
| Potassium | 2.51% | 2.40% | 2.39% | 2.30% | −8.4% |
| Calcium | 2.4% | 2.4% | 2.4% | 2.3% | −4.2% |
| Total Phosphorus | 0.34% | 0.32% | 0.30% | 0.25% | −26.5% |
| Water Soluble Phosphorus | 0.25% | 0.23% | 0.23% | 0.17% | −32.0% |

In Table V, the moisture as received was the percent of native moisture content of the soiled litter, and the protein was the percent protein plus bound ammonia. The following observations can be made.

Litter Composition 3 (100% used citrus litter) had a moisture reduction of 21.5% over control litter Composition 1. This indicates that the citrus byproduct Composition 3 facilitated release of moisture within the pens, apparently due to evaporation within the poultry facility. Total nitrogen content of litter Composition 3 showed an increase of 19.5% over the control litter Composition 1. There was a 19.6 increase of Composition 3 over Composition 1 in calculated protein content. This indicates more effective ammonia binding by the citrus byproduct litter, indicating enhanced ammonia control within the pens and enhanced value as a feedstock. Same also has enhanced value as fertilizer in providing a slow release source of nitrogen for agricultural and horticultural applications.

The total phosphorus content was 26.5% lower for litter Composition 3 (100% used citrus) when compared with control Composition 1, and the water soluble phosphorus was reduced 32.0% by Composition 3 when compared with the control. These data indicate that the citrus byproduct litter has environmental advantages as noted in Example 1.

EXAMPLE 3

A study was conducted to evaluate bedding litters within pens of the type typically used in poultry raising facilities and generally as described in Examples 1 and 2. The testing was carried out over a 42 day growing period for broiler chickens. This study focused upon darkling beetle and larva control, as well as on ammonia control. Also, litter used in this study was utilized as used or pre-soiled litter for the study reported in Example 4.

The protocol for this study was substantially in accordance with the other Examples. Here about 45 birds were placed in each of 40 pens and fed and given water generally as in Example 2. Twenty of these pens contained fresh 100% pine wood shavings. These are identified as Compositions 1 and 4. Ten of the pens were designated to have Composition 2, which was 100% fresh dried citrus by product flake. The remaining ten pens contained Composition 3, which was 50% fresh pine wood shavings and 50% fresh dried citrus byproduct flake mixed together.

Beetle and Larvae Counts

At about day 2, all of the pens were seeded with beetles and larvae. Counts at this inoculation were 422 adult beetles and 284 larvae, which was considered to be a formidable inoculation. Beetle collection chambers having PVC piping (12 inches) were placed in the litter of each pen on about day 41. This collection used a beetle tray method to estimate beetle and larval populations which was generally in accordance with the Arends tube trap approach as noted in Safrit et al, "Evaluations of Sampling Methods for Darkling Beetles (Alphitobius diaperinus) in the Litter of Turkey and Broiler Houses", Journal Series of the North Carolina Agricultural Research Service, Raleigh, N.C., Paper No. 9161, 1984; and Khan, et al, "Efficiency of Tetrachlorvinphos Insecticide Dust Against Dakling Beetles in Commercial Broiler Chicken Barns", Canadian Journal of Animal Science, Volume 78, Issue 4, pages 723–725, 1998. These are incorporated by reference hereinto. The piping used in this study had a corrugated liner and a flute. One tube per 1000 square feet of each chicken house was used. The tubes were placed parallel to the side wall, level with the top surface of the litter. Care was taken to avoid placement under drinkers or feed trays due to potential moisture excesses.

Figure 5:
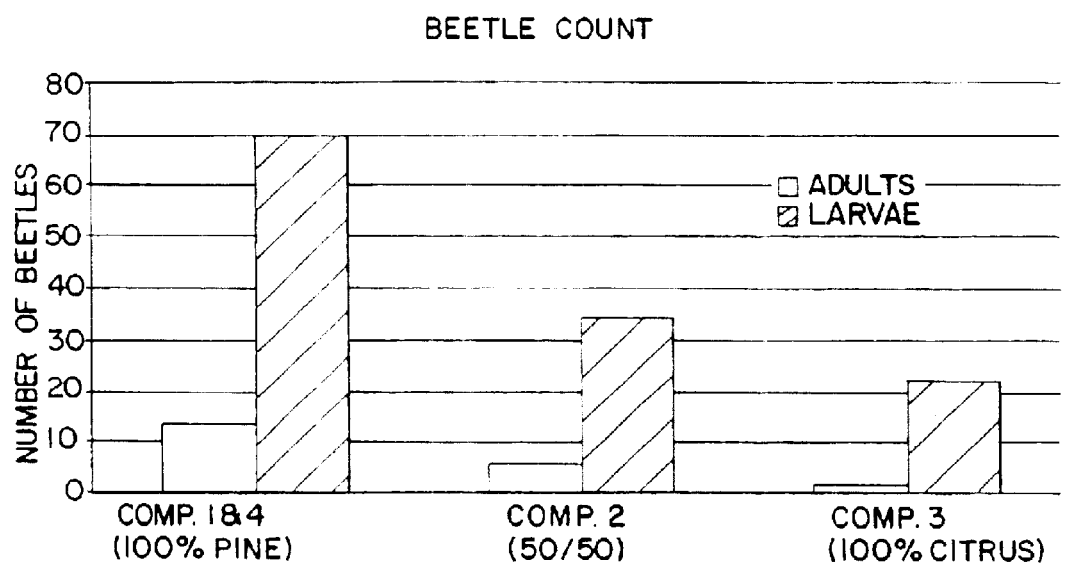
FIG. 5 is a bar graph plot of beetle count data discussed in Example 3.

Counts were as follows. For the 100% fresh pine wood shavings litter (Compositions 1 and 4), the average beetle count was 13.5 beetles, and the average larva count was 70 larvae. For the 50/50 pine/citrus litter (Composition 2), the average beetle count was 6 beetles and the average larva count was 35 larvae. For the 100% fresh citrus litter (Composition 3), the average beetle count was 2 beetles, and the average larva count was 23 larvae. These data are illustrated in the bar graphs of FIG. 5.

It will be appreciated that the citrus-containing litters showed a reduction of 50% or more in beetle infestation over the 100% pine litter. The 100% citrus litter far exceeded this level of improvement.

Ammonia Levels

Ammonia levels in all pens were determined at day 43. A barrel was placed over a specific area in each pen, and the building housing them was heated to approximately 90° F. Ammonia levels in the air above the litter covered by the barrel was measured at 24 and at 48 hours following placement of the barrels. Ammonia detection equipment as described herein was used. Before conducting this test on the Composition 4 pens, fresh citrus litter was spread over the soiled 100% pine litter so as to approximate an 80/20 mixture which has a top-dressed litter assembly scheme. The thus layered litter assembly was allowed to settle for 24 hours before the temperature was raised to 90° F.

Figure 6:
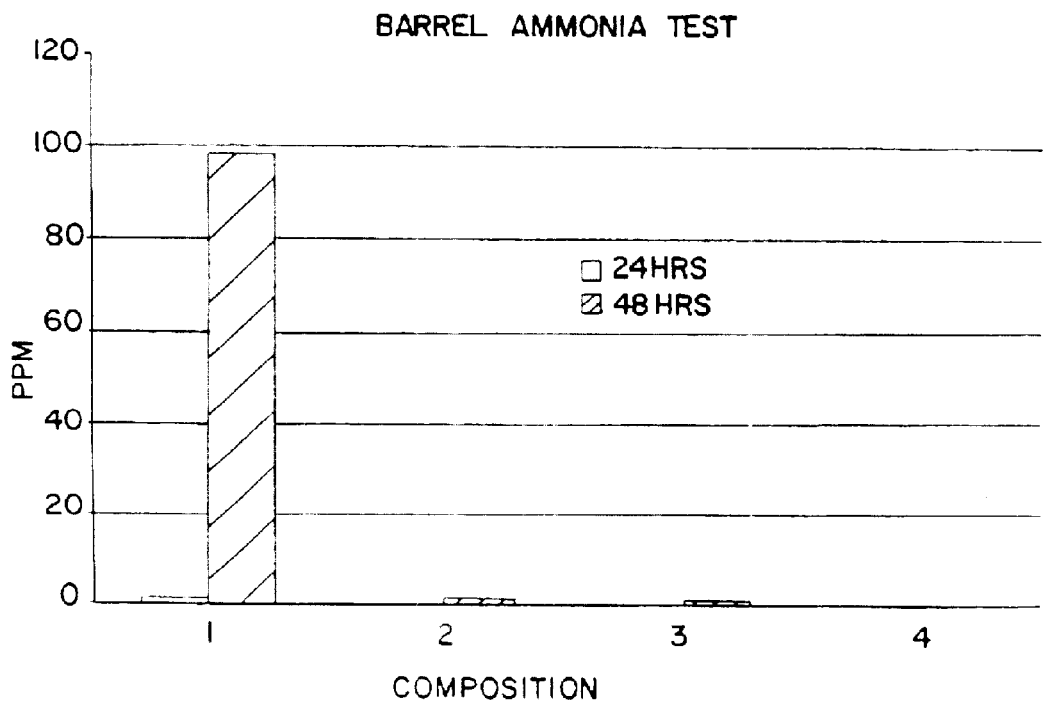
FIG. 6 is a bar graph plot of data from a barrel ammonia test in Example 3.

Results were as follows. More than 24 hours were needed to detect substantial ammonia levels. At 48 hours, the 100% pine Composition 1 gave an average reading of 98 ppm. For Compositions 2 and 3 (50/50 and 100% citrus, respectively), the average reading was 1 ppm ammonia. For the top-dressed Composition 4, the average reading was 0 ppm ammonia. These data are reported in bar graph form in FIG. 6.

EXAMPLE 4

Utilizing the soiled or used litter materials from Example 3, a study was conducted to evaluate bedding litters within pens of the type typically used in poultry raising facilities and generally in accordance with the study protocol of Example 2. This study was begun about one week after completion of the Example 3 study.

The total number of pens used in the study was 40, with approximately 52 birds being in each pen at the initiation of the study. At day 7, each pen was targeted to have 50 birds, four different bedding litter compositions were used, and each composition was experienced by a target of 500 birds, there being 10 pens for each litter composition.

The bedding litter compositions were as follows. Composition 1 was the control, namely 100% used pine wood shavings of Example 3, Composition 1. Composition 2 was a 50:50 (volume %/volume %) blend of used pine and citrus, used Composition 2 of Example 3. Composition 3 was 100% used dried citrus byproduct from Example 3, Composition 3. Composition 4 was the used pine shavings from Composition 4 of Example 3 which were top dressed with fresh citrus peel litter in a layered combination of 80% pine and 20% citrus. This provided a top dressing of about 1 inch to 2 inches of citrus peel litter onto the used pine litter.

The feed and water were provided ad libitum throughout the study generally in accordance with Example 2. The test facility, pens and birds were observed at least twice daily for general flock condition, lighting, water, feed, ventilation, daily maximum and minimum temperatures, and any unanticipated events. At about day 35, there was a ventilation equipment failure which caused high mortality in the compartments having Compositions 2 and 3. A recording error also occurred at about this same time. Pens affected were not included in reports of averages of parameters generated by the testing. Birds were weighed on a pen basis on day 49, and feed remaining in the feeders was weighed and recorded at this time.

Carcass Quality Results

The quality of each carcass was determined in accordance with the procedures of Example 1. Twenty pens, a total of about 1000 birds, were thus evaluated.

Figure 7:
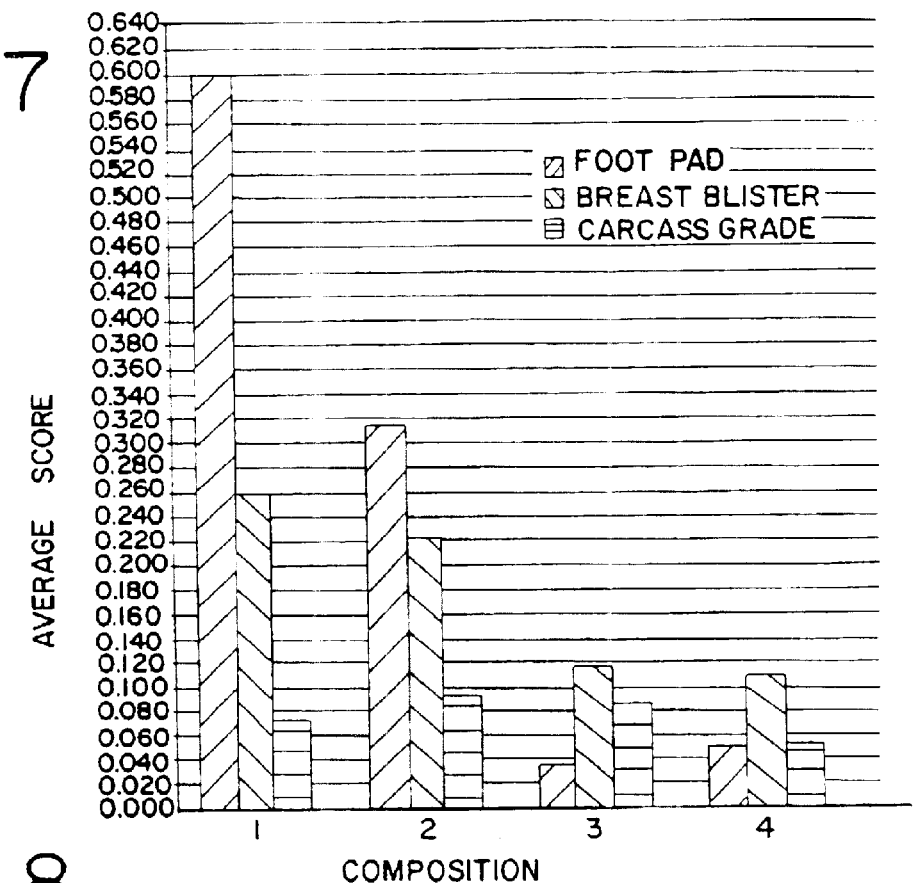
FIG. 7 is a plot of foot pad, breast blister and carcass grade results from Example 4.

A summary of the day 50 foot pad scores, carcass grades and breast blister scores are provided in Table VI. These data are plotted in the bar graphs of FIG. 7.

TABLE VI

|  | Foot Pads | Breast Blister | Carcass Grade |
| --- | --- | --- | --- |
| Comp. 1 (100% pine) | 0.599 | 0.259 | 0.73 |
| Comp. 2 (50/50) | 0.316 | 0.223 | 0.093 |
| Comp. 3 (100% citrus) | 0.035 | 0.117 | 0.087 |
| Comp. 4 (80/20 top dr.) | 0.049 | 0.111 | 0.053 |

Figure 8:
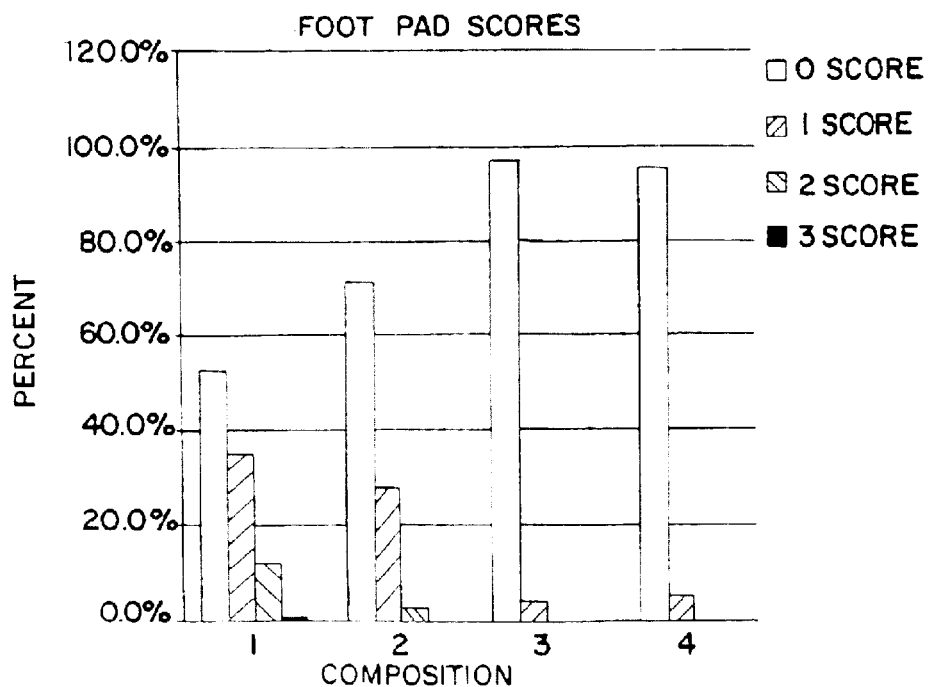
FIG. 8 bar graph plots more detailed data for the foot pad scores from Example 4.

A breakdown of the foot pad lesion scores of Table VI, is provided in TABLE VII. It will be noted that almost half of the birds on litter Composition 1 (100% used pine litter) had a foot pad score of 1, 2 or 3, and only about half had the most desirable "0" score. By contrast the "0" score for each of the compositions including citrus litter was attained by at least 70% of the birds, and greater than 95% for the 100% used citrus and the citrus top dressed litter. These foot pad scores are graphed in FIG. 8.

TABLE VII

| | Percent of Birds With Foot Pad Score of: | | | |
|---|---|---|---|---|
| | 0 Score | 1 Score | 2 Score | 3 Score |
| Comp. 1 (100% pine) | 52.6% | 35.3% | 11.6% | 0.4% |
| Comp. 2 (50/50) | 70.5% | 27.5% | 2.1% | 0.0% |
| Comp. 3 (100% citrus) | 96.5% | 3.5% | 0.0% | 0.0% |
| Comp. 4 (80/20 top dr.) | 95.1% | 4.9% | 0.0% | 0.0% |

Feed Conversion and Mortality Results

Performance data for birds at 49 days of age are reported in Table VIII.

TABLE VIII

| | Bird Wt. (kg) | Mortality (%) | Feed Conversion | Adjusted Feed Conversion |
|---|---|---|---|---|
| Comp. 1 (100% pine) | 2.633 | 4.60% | 1.852 | 1.802 |
| Comp. 2 (50/50) | 2.482 | 2.20% | 1.860 | 1.805 |
| Comp. 3 (100% citrus) | 2.601 | 1.60% | 1.830 | 1.794 |
| Comp. 4 (80/20 top dr.) | 2.584 | 1.80% | 1.819 | 1.799 |

The performance data for Compositions 2 and 3 (50/50 mixture and 100% Citrus) were determined using linear and quadratic regression analyses of mean values from replicated (n=10) pens. This calculation was made necessary due to the ventilation equipment failure which occurred toward the end of the study (day 35) as noted above and because exact bird weights and exact feed usage was recorded only at the beginning and end of the study. These calculations included information from the dead bird records and constructed growth curves of birds before and after the ventilation failure and resultant temperature spike. The day 49 performance values were determined using the regression curves of weight gain extended from 35 to 49 days of growth. This approach followed an assumption that the dead bird weights were representative of the larger bird population.

Ammonia Levels

Figure 9:
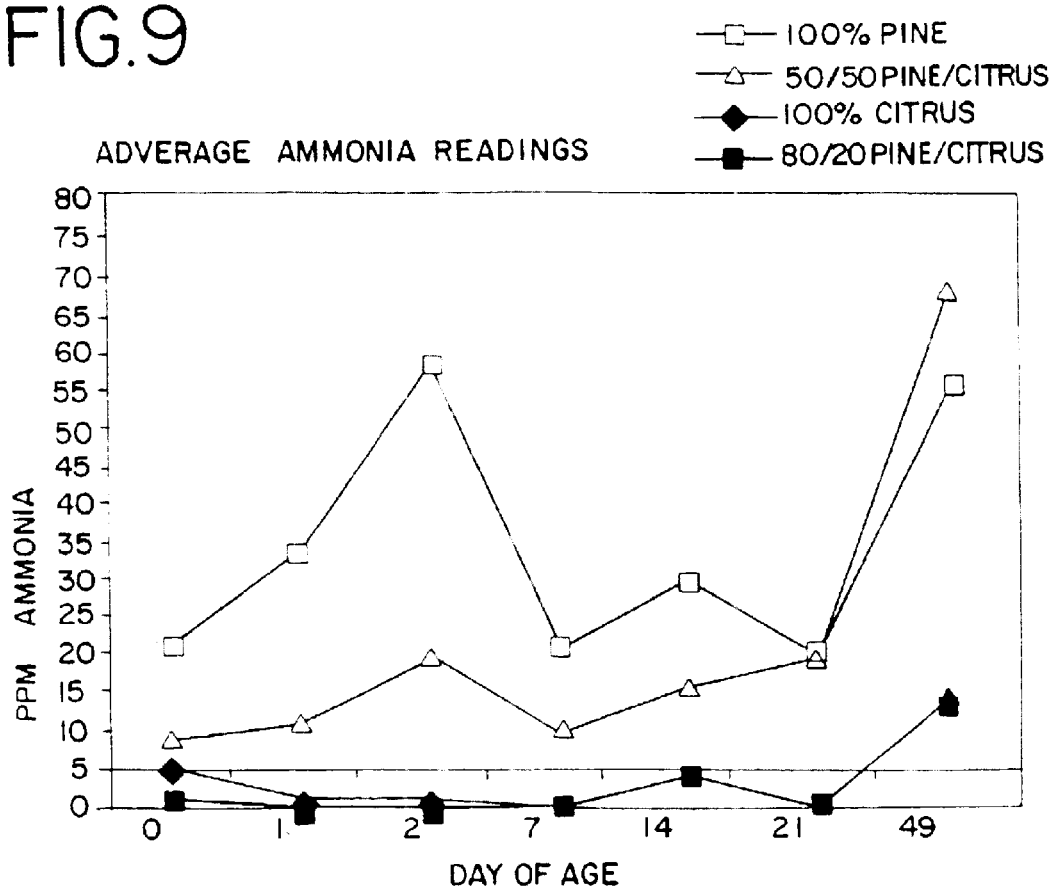
FIG. 9 plots average ammonia readings taken with respect to the four litter compositions of Example 4.

At the beginning, intermediate days and at the end of the study of this Example 4, ammonia levels in the air at about 6 inches above the litter were measured in four pens of each composition. These amounted to 16 measurements at each of the seven periods, with measurements taken on days 0, 1, 2, 7, 14, 21 and 49. Ammonia levels were measured using a Matheson Toxic Gas Detector, Model 8014KA and Precision Gas Detector Tubes #105SC (5–260 ppm). The ammonia levels of Composition 1 (100% pine) were consistently found to be the highest. The ammonia levels found in Composition 3 (100% citrus) and Composition 4 (80/20 top dressed) were consistently lower and similar to each other. The data averages are reported in TABLE IX and are plotted in FIG. 9.

TABLE IX

Average Ammonia Readings (PPM)

| | Day | | | | | | |
|---|---|---|---|---|---|---|---|
| | 0 | 1 | 2 | 7 | 14 | 21 | 49 |
| Comp. 1 (100% pine) | 21 | 34 | 59 | 21 | 30 | 20 | 56 |
| Comp. 2 (50/50) | 9 | 11 | 20 | 10 | 16 | 20 | 69 |
| Comp. 3 (100% citrus) | 5 | 1 | 1 | 0 | 4 | 0 | 15 |
| Comp. 4 (80/20 top dr.) | 1 | 0 | 0 | 0 | 4 | 0 | 14 |

Figure 10:
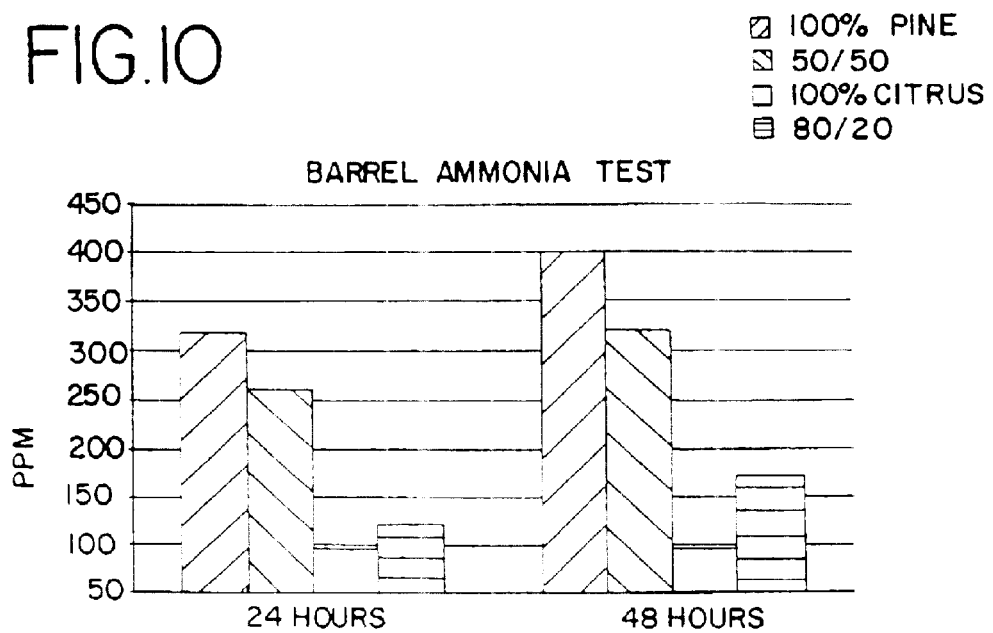
FIG. 10 provides a bar graph plot of barrel ammonia test data discussed in Example 4.

Ammonia barrel testing also was carried out as described in Example 3. The data are reported in Table X and plotted in FIG. 10.

TABLE X

Average Ammonia Readings (Barrel Test)

| Composition | 24 Hours | 48 Hours |
|---|---|---|
| Comp. 1 (100% pine) | 317.1 | 399.3 |
| Comp. 2 (50/50) | 261.4 | 318.6 |
| Comp. 3 (100% citrus) | 96.4 | 95.7 |
| Comp. 4 (80/20 top dr.) | 121.0 | 170.0 |

This barrel testing gave essentially the same indications as the ammonia readings measured during the course of this study, with the 100% pine letter giving the highest ammonia readings.

Nutrient and Nitrogen Analysis

At the end of the study of this Example 4, consolidated litter samples were subjected to nutrient and nitrogen analysis. These included pH, moisture, nitrogen in accordance with the Kjeldahl procedure, protein (nitrogen×6.25) fat percent, crude fiber, calcium, potassium, total phosphorus, and water soluble phosphorus. The test results data are reported in Table XI.

TABLE XI

ANALYSES OF SOILED USED POULTRY LITTER

| Assay (Analyte) | Comp. 1 | Comp. 4 | Comp. 2 | Comp. 3 | 3 vs. 1 |
|---|---|---|---|---|---|
| Moisture | 33.1% | 22.9% | 28.8% | 23.4% | −29% |
| PH | 7.66 | 7.49 | 7.68 | 7.08 | — |
| Total Nitrogen | 3.5% | 4.5% | 4.4% | 4.6% | +31% |
| Total Protein | 21.9% | 28.2% | 27.4% | 28.8% | +32% |
| Total Fat | 3.7% | 4.3% | 4.1% | 4.1% | +12% |
| Crude Fiber | 28.5% | 19.3% | 17.6% | 12.8% | −55% |
| Potassium | 2.7% | 2.6% | 2.9% | 2.5% | −10% |
| Calcium | 2.6% | 2.5% | 2.8% | 2.4% | −4.0% |
| Total Phosphorus | 2.2% | 1.7% | 1.9% | 1.5% | −29% |
| Water Soluble Phosphorus | 0.26% | 0.15% | 0.19% | 0.14% | −46% |

The following observations can be made. Litter Composition 3 (100% used citrus litter) had a moisture reduction of 29% over control litter Composition 1. This indicates that the citrus byproduct Composition 3 facilitated release of moisture within the pens, apparently due to evaporation within the poultry facility. Total nitrogen content of litter Composition 3 showed an increase of 31% over the control litter Composition 1. There was a 32% increase of Composition 3 over Composition 1 in calculated protein content. This indicates more effective ammonia binding by the citrus byproduct litter, indicating enhanced ammonia control within the pens and enhanced value as a feedstock and as fertilizer. Other data indicate environmental advantages as noted in Example 1.

Litter Moisture

Figure 11:
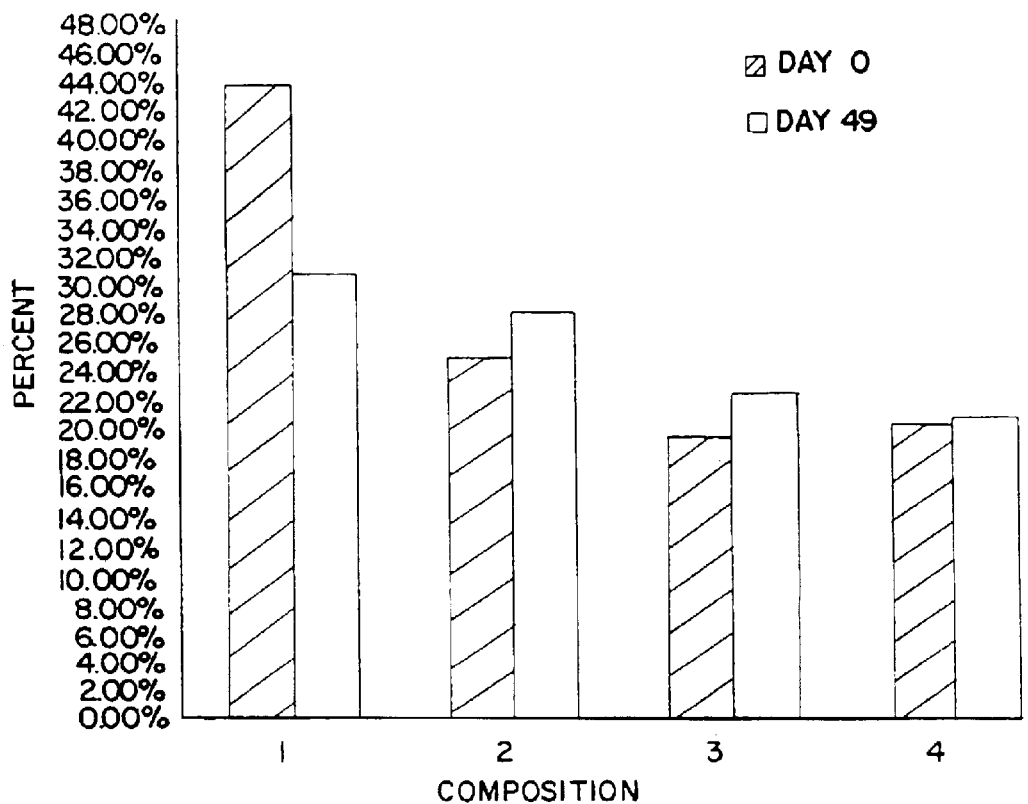
FIG. 11 gives a bar graph report of litter moisture data from Example 4.

The litter moisture levels for days 0 and 49 are reported in TABLE XII and plotted in FIG. 11.

TABLE XII

Litter Moisture Levels

| Composition | Day 0 | Day 49 |
|---|---|---|
| Comp. 1 (100% pine) | 44.0% | 31.0% |
| Comp. 2 (50/50) | 25.2% | 28.2% |
| Comp. 3 (100% citrus) | 19.8% | 22.7% |
| Comp. 4 (80/20 top dr.) | 20.6% | 21.1% |

Moisture levels were consistently higher for the used 100% pine litter, both at beginning and end of the study.

Beetle Counts

On about day 48 of this study, a beetle collection chamber as described previously was placed in the litter under a feeder in each pen. Approximately 24 hours later, the numbers of beetles and larvae present in each chamber were counted and recorded.

Figure 12:
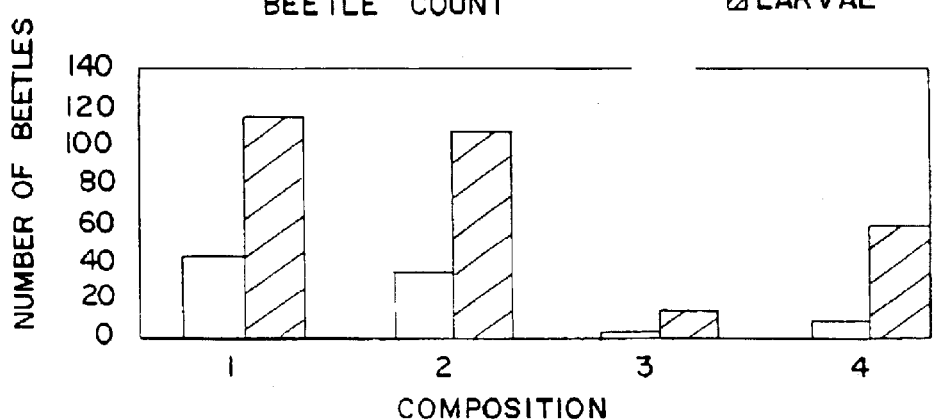
FIG. 12 plots beetle count data discussed in Example 4.

The day 49 darkling beetle counts are presented in TABLE XIII and plotted in FIG. 12.

TABLE XIII

Average Beetle and Larvae Counts

| Composition | Adults | Larvae |
|---|---|---|
| Comp. 1 (100% pine) | 43 | 115 |
| Comp. 2 (50/50) | 35 | 108 |
| Comp. 3 (100% citrus) | 3 | 16 |
| Comp. 4 (80/20 top dr.) | 10 | 59 |

The beetle counts were dramatically lowest for the 100% used citrus litter, and the 80/20 top dressed litter was on the order of half of the 100% used pine litter.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A bedding litter composition for poultry raising within confined spaces, the bedding litter composition comprising at least one citrus byproduct component from citrus juice expressing, said citrus byproduct component being a flaked composition including citrus peel, said flaked composition being in a dried state.

2. The bedding litter composition in accordance with claim 1, wherein said citrus peel byproduct component has a moisture content of between about 5 and about 12 percent by weight, based upon the total weight of the citrus byproduct.

3. The bedding litter composition in accordance with claim 1, wherein said bedding litter composition includes between about 10 and about 100 volume percent of said citrus byproduct component, and between about 0 and about 90 volume percent of a secondary bedding litter component other than said citrus byproduct component.

4. The bedding litter composition in accordance with claim 3, wherein said citrus byproduct component of the bedding litter composition is a top dressing over said secondary bedding litter component.

5. The bedding litter composition in accordance with claim 1, wherein said bedding litter composition includes at least about 10 volume percent of said citrus byproduct and up to about 90 weight percent of a secondary bedding litter component.

6. The bedding litter composition in accordance with claim 5, wherein said citrus byproduct component and said secondary bedding litter component are mixed together.

7. The bedding litter composition in accordance with claim 5, wherein said secondary bedding litter component is selected from the group consisting of wood or woody plant originating materials, vegetation source materials, and combinations thereof.

8. The bedding litter composition in accordance with claim 5, wherein said secondary bedding litter component is wood in shavings form.

9. The bedding litter composition in accordance with claim 5, wherein said citrus byproduct is a top layer on said secondary bedding litter component.

10. The bedding litter composition in accordance with claim 9, wherein said secondary bedding litter component is a pre-used litter which had been used during at least one poultry raising operation.

11. The bedding litter composition in accordance with claim 10, wherein said pre-used litter is selected from the group consisting of wood or woody plant originating materials, vegetation source materials, and combinations thereof.

12. The bedding litter composition in accordance with claim 10, wherein said pre-used litter is a citrus originating litter.

13. The bedding litter composition in accordance with claim 1, wherein said citrus byproduct includes pectin, demethylated pectin, and combinations thereof.

14. The bedding litter composition in accordance with claim 1, wherein said citrus byproduct includes a food grade citrus-originating acid in its native state as present in dried citrus byproduct from juice extraction equipment.

15. The bedding litter composition in accordance with claim 1, wherein said citrus byproduct component is selected from the group consisting of ascorbic acid, a carotenoid, beta-carotene, beta-cryptoxanthin, lycopene, xanthophyll, and combinations thereof, in its native state as present in dried citrus byproduct from juice extraction equipment.

16. The bedding litter composition in accordance with claim 1, wherein said citrus byproduct component is selected from the group consisting of naringin, naringenin, narirutin, hesperidin, hesperetin, other flavonoids, and combinations thereof, in its native state as present in dried citrus byproduct from juice extraction equipment.

17. The bedding litter composition in accordance with claim 1, wherein said citrus byproduct component is selected from the group consisting of sinensetin, tangeretin, nobiletin, other polymethoxylated flavones, and combinations thereof, in its native state as present in dried citrus byproduct from juice extraction equipment.

18. The bedding litter composition in accordance with claim 1, wherein said citrus byproduct component is a tocopherol, in its native state as present in dried citrus byproduct from juice extraction equipment.

19. The bedding litter composition in accordance with claim 1, wherein said citrus byproduct component is selected from the group consisting of limonin, nomolin, a limonin glucoside, d-limonene, and combinations thereof, in its native state as present in dried citrus byproduct from juice extraction equipment.

20. The bedding litter composition in accordance with claim 1, wherein said citrus byproduct includes pectin, demethylated pectin, citric acid, folic acid, ascorbic acid, a carotenoid, beta-carotene, beta-cryptoxanthin, lycopene, xanthophyll, naringin, naringenin, narirutin, hesperidin, hesperetin, sinensetin, tangeretin, nobiletin, a tocepherol, limonin, nomolin, a limonin glucoside, and d-limonene.

21. The bedding litter composition in accordance with claim 1, wherein said citrus byproduct includes a pectin, a food grade acid, ascorbic acid, a carotenoid, a citrus originating flavonoid, a citrus originating polymethoxylated flavone, and a tocopherol.

22. The bedding litter composition in accordance with claim 1, wherein said citrus byproduct component results in lower beetle counts during use when compared with beetle counts during use of the bedding litter which is about 100 volume percent pine wood shavings.

23. The bedding litter composition in accordance with claim 1, wherein said citrus byproduct component results in lower ammonia levels during use when compared with ammonia levels during use of the bedding litter which is about 100 volume percent pine wood shavings.

24. The bedding litter composition in accordance with claim 1, wherein said citrus byproduct component results in lower coliform counts during use when compared with coliform counts during use of the bedding litter which is about 100 volume percent pine wood shavings.

25. A bedding litter composition for poultry, the bedding litter composition comprising a pre-used litter and a top dressing thereover, said top dressing being at least one citrus byproduct component from citrus juice expressing, said citrus byproduct component being a flaked composition including citrus peel, said flaked composition being in a dried state.

26. The bedding litter composition in accordance with claim 25, wherein said top dressing is at least about 1 inch thick.

27. The bedding litter composition in accordance with claim 25, wherein said top dressing has a thickness of between about 1 inch and about 2 inches.

28. The bedding litter composition in accordance with claim 25, wherein said top dressing comprises at least about 10 volume percent of said bedding litter composition.

29. The bedding litter composition in accordance with claim 28, wherein said top dressing is at least about 1 inch thick.

30. The bedding litter composition in accordance with claim 28, wherein said top dressing has a thickness of between about 1 inch and about 2 inches.

31. The bedding litter composition in accordance with claim 25, wherein said top dressing comprises at least about 20 volume percent of said bedding litter composition.

32. The bedding litter composition in accordance with claim 31, wherein said top dressing is at least about 1 inch thick.

33. The bedding litter composition in accordance with claim 31, wherein said top dressing has a thickness of between about 1 inch and about 2 inches.

34. The bedding litter composition in accordance with claim 25, wherein said pre-used litter is a secondary bedding litter component.

35. The bedding litter composition in accordance with claim 34, wherein said secondary bedding litter component is selected from the group consisting of wood or woody plant originating materials, vegetation source materials, and combinations thereof.

36. The bedding litter composition in accordance with claim 34, wherein said secondary bedding litter component is wood in shavings form.

37. The bedding litter composition in accordance with claim 34, wherein said top dressing is a top layer having a thickness of at least about 1 inch of said secondary bedding litter component.

38. The bedding litter composition in accordance with claim 34, wherein said secondary bedding litter component is a pre-used litter which had been used during at least one poultry raising operation.

39. The bedding litter composition in accordance with claim 25, wherein said pre-used litter is a secondary bedding litter component other than said citrus byproduct component.

40. The bedding litter composition in accordance with claim 25, wherein said pre-used litter is said citrus byproduct component and a secondary bedding litter component mixed together.

41. The bedding litter composition in accordance with claim 25, wherein said pre-used litter is a citrus originating litter.

* * * * *